United States Patent
Balakrishnan et al.

(10) Patent No.: US 7,512,738 B2
(45) Date of Patent: Mar. 31, 2009

(54) ALLOCATING CALL STACK FRAME ENTRIES AT DIFFERENT MEMORY LEVELS TO FUNCTIONS IN A PROGRAM

(75) Inventors: Vinod K. Balakrishnan, Beaverton, OR (US); Ruiqi Lian, Beijing (CN); Junchao Zhang, Beijing (CN); Dz-ching Ju, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 646 days.

(21) Appl. No.: 10/956,186

(22) Filed: Sep. 30, 2004

(65) Prior Publication Data

US 2006/0070046 A1   Mar. 30, 2006

(51) Int. Cl.
*G06F 12/00* (2006.01)

(52) U.S. Cl. .............. 711/132; 711/119; 711/156; 717/133; 717/136; 717/138

(58) Field of Classification Search ............ 711/132
See application file for complete search history.

(56) References Cited

U.S. PATENT DOCUMENTS

| | | | | |
|---|---|---|---|---|
| 5,043,870 A | * | 8/1991 | Ditzel et al. ............ | 711/132 |
| 5,835,958 A | * | 11/1998 | Long et al. ............ | 711/170 |
| 6,289,418 B1 | * | 9/2001 | Koppala ............ | 711/132 |
| 6,961,930 B1 | * | 11/2005 | Waldspurger et al. ....... | 717/141 |
| 6,968,557 B1 | * | 11/2005 | Zhang et al. ............ | 719/319 |
| 7,000,071 B2 | * | 2/2006 | Ciesinger et al. ............ | 711/115 |
| 7,124,251 B2 | * | 10/2006 | Clark et al. ............ | 711/132 |

OTHER PUBLICATIONS

Microsoft Computer Dictionary, Fifth Edition, p. 495.*
Microsoft Corporation, "Microsoft Computer Dictionary", 2002, Microsoft Corporation, Fifth Edition, p. 495.*
Artale, A., "Principle of Compilers- Lecture I: Introduction to Compilers", Free University of Bolzano, 2003/2004, 26 pp.
Roy, G., "Call Stacks and Symbol Tables", Mpatrol Manual, Edition 2.13, Chapter 6.2, [online], Jan. 9, 2002, [retrieved on Jul. 21, 2004], retrieved from the Internet at <URL: http://www.cbmamiga.demon.co.uk/mpatrol/mpatrol_14.html>, 2 pp.
Roy, G., "Stack Memory Allocations", Mpatrol Manual, Edition 2.13, Chapter 5.2, [online], Jan. 9, 2002, [retrieved on Jul. 21, 2004], retrieved from the Internet at <URL: http://www.cbmamiga.demon.co.uk/mpatrol/mpatrol_10.html>, 1 pg.

(Continued)

*Primary Examiner*—Kevin Ellis
*Assistant Examiner*—Hashem Farrokh
(74) *Attorney, Agent, or Firm*—Konrad Raynes & Victor, LLP.; David W. Victor

(57) ABSTRACT

Provided are a method, system, and program for allocating call stack frame entries at different memory levels to functions in a program. Functions in a program accessing state information stored in call stack frame entries are processed. Call stack frame entries are allocated to the state information for each function, wherein the call stack frame entries span multiple memory levels, and wherein one function is capable of being allocated stack entries in multiple memory levels.

33 Claims, 6 Drawing Sheets

OTHER PUBLICATIONS

Shah, B., "Advanced Call Graph Profiling Techniques: Intel VTune Performance Analyzer", Intel White Paper, 2004, 12 pp.

University of Warwick, "Stack, Heap and Frame Stack", [online], [retrieved on Jul. 21, 2004], retrieved from the Internet at <URL: http://www.warwick.ac.uk/research/modelling/other/eden/advanced/notes/stack.html>, 3 pp.

Wikipedia, "Linker", [online], [retrieved on Jul. 21, 2004], retrieved from the Internet at <URL: http://en.wikipedia.org/wiki/Linker>, 2pp.

XGC Software, "Examining the Stack", Debugging Ada Programs, Chapter 6, [online], [retrieved on Jul. 21, 2004], retrieved from the Internet at <URL: http://www.xgc.com/manuals/m1750-ada/xgc-ada-gdb/c1671.html>, 2 pp.

Yang, L., S. Chan, G.R. Gao, R. Ju, G. Lueh, and Z. Zhang, "Inter-Procedural Stacked Register Allocation for Itanium Like Architecture", Proceedings of the 17th Annual International Conference on Supercomputing, Jun. 2003, pp. 215-225.

\* cited by examiner

Call Graph Node

ALLOCATING CALL STACK FRAME ENTRIES AT DIFFERENT MEMORY LEVELS TO FUNCTIONS IN A PROGRAM

BACKGROUND

A program call stack provides a representation of entries in a memory device in which data may be stored. Each function in a program is associated with a frame in a call stack, where the frame designates sequential entries in the call stack to store state information for the function, such as local variables, arguments, caller/callee saved registers, register spills, spilled function arguments, return values, etc. Each thread of execution has its own call stack, where a thread is an independent flow of control execution. The frame in a call stack maps to call stack frame entries in one memory device. When a function is invoked, its frame is allocated at the top of the call stack. When the function returns, the frame is de-allocated. In this way, the memory locations represented by the stack are allocated per process and generally grow down in memory. When a function is called, the state information of the calling function is preserved so that when the called function returns, the calling function can resume execution. The compiler generates code to increase the size of the stack upon entry to a function, and decreases the size of the stack upon exit from a function, as well as saving and restoring the values of registers.

Function frames are typically allocated as a single call stack frame entry (as opposed to a fixed memory location for each function frame). Furthermore, the call stack along with calling convention provides the function scope for the compiler to operate.

Certain processing devices, such as network processors, include multiple packet processors, also known as packet engines, that may reuse and execute the same code. Network processors also utilize multiple memory devices, such as a local memory, scratch memory, Static Random Access Memory (SRAM), Dynamic Random Access Memory (DRAM), etc. In such devices using a multi-level memory hierarchy, each memory level, i.e., device, is accessed with its own set of instructions, registers, and address space. In such network processor devices, a call stack is not used, and state information for the functions called by the different packet processors are allocated to static locations in the different memory devices.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
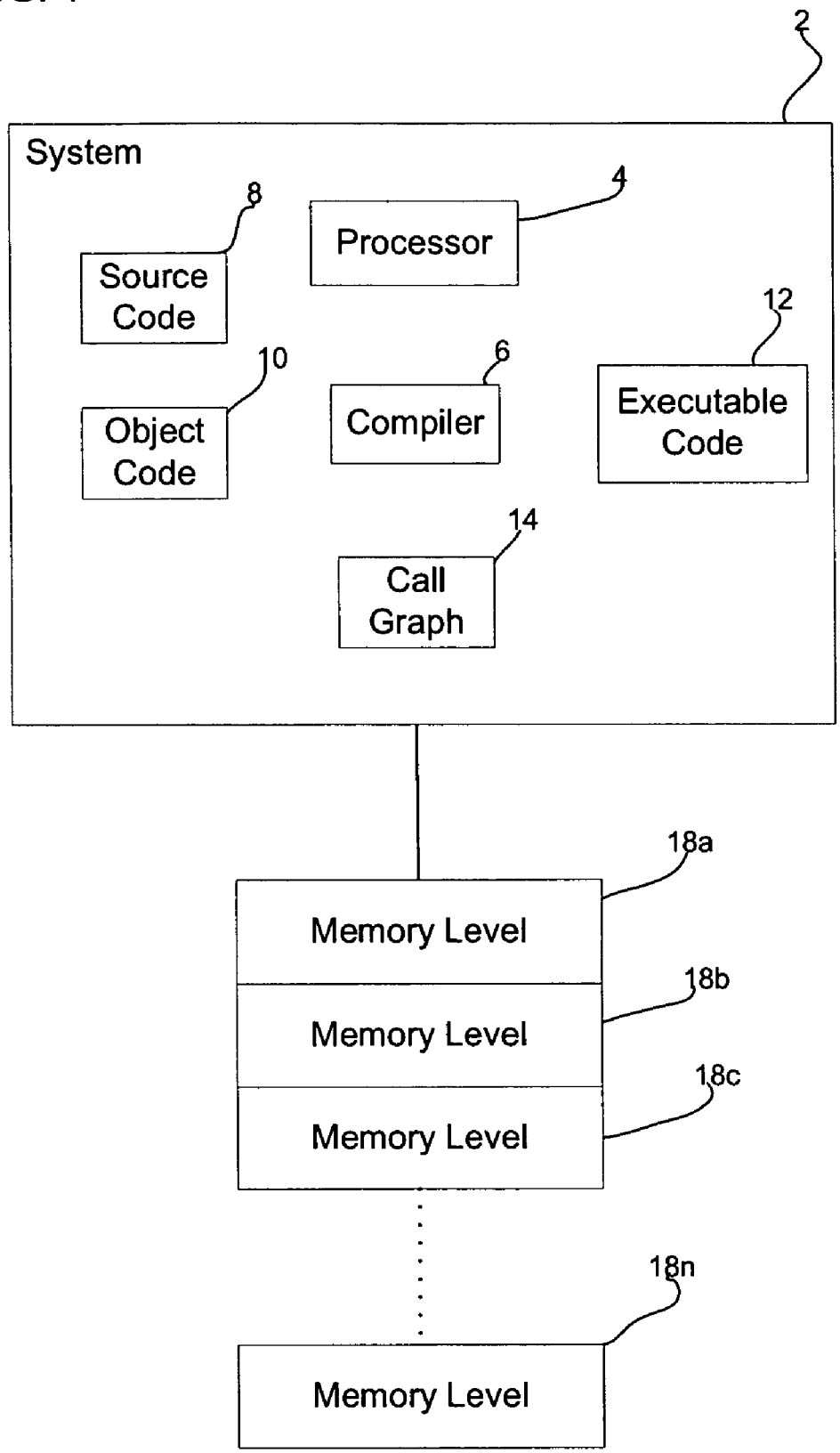
FIG. 1 illustrates an embodiment of a computing environment.

FIG. 1 illustrates a computer system 2 having a processor 4 that executes a compiler 6. The compiler 6 translates source code 8, written in a high level computer language, into object code 10, comprising an intermediate representation of the source code that can be translated into the final executable code 12. The object code 10 may also include relocation information that a linker (not shown) uses to assemble multiple object files into an executable or library, program symbols (names of variables and functions), and debugging information. The compiler 6 further generates a call graph 8 providing a representation of a run-time calling relationship among the programs functions, i.e., procedures represented in the source code 8, object code 10, and executable code 12. The call graph 14 consists of nodes representing procedures that are linked by directed edges representing calls from one procedure to another. The content of the stack frame for each function represented in the call graph 14 may include variables, arguments, caller/callee saved registers, register spills, spilled function arguments, return values, etc. In certain embodiments, the compiler 6 may generate the object code 10 and call graph 14 internally as temporary data structures used to generate the target executable code 12.

In described embodiments, the executable program 12 is intended to execute in a multi-level memory environment, where there are different levels of memory 18a, 18b, 18c . . . 18n. Each memory level may comprise a different memory device having different performance characteristics or different sections of a same memory device. For instance, the first memory level 18a may be a local memory device, such as on-board cache, that is the fastest access memory, memory level 18b may comprise a scratch memory, and memory levels 18c . . . 18n may comprise additional memory devices coupled to the system 2.

Figure 2:
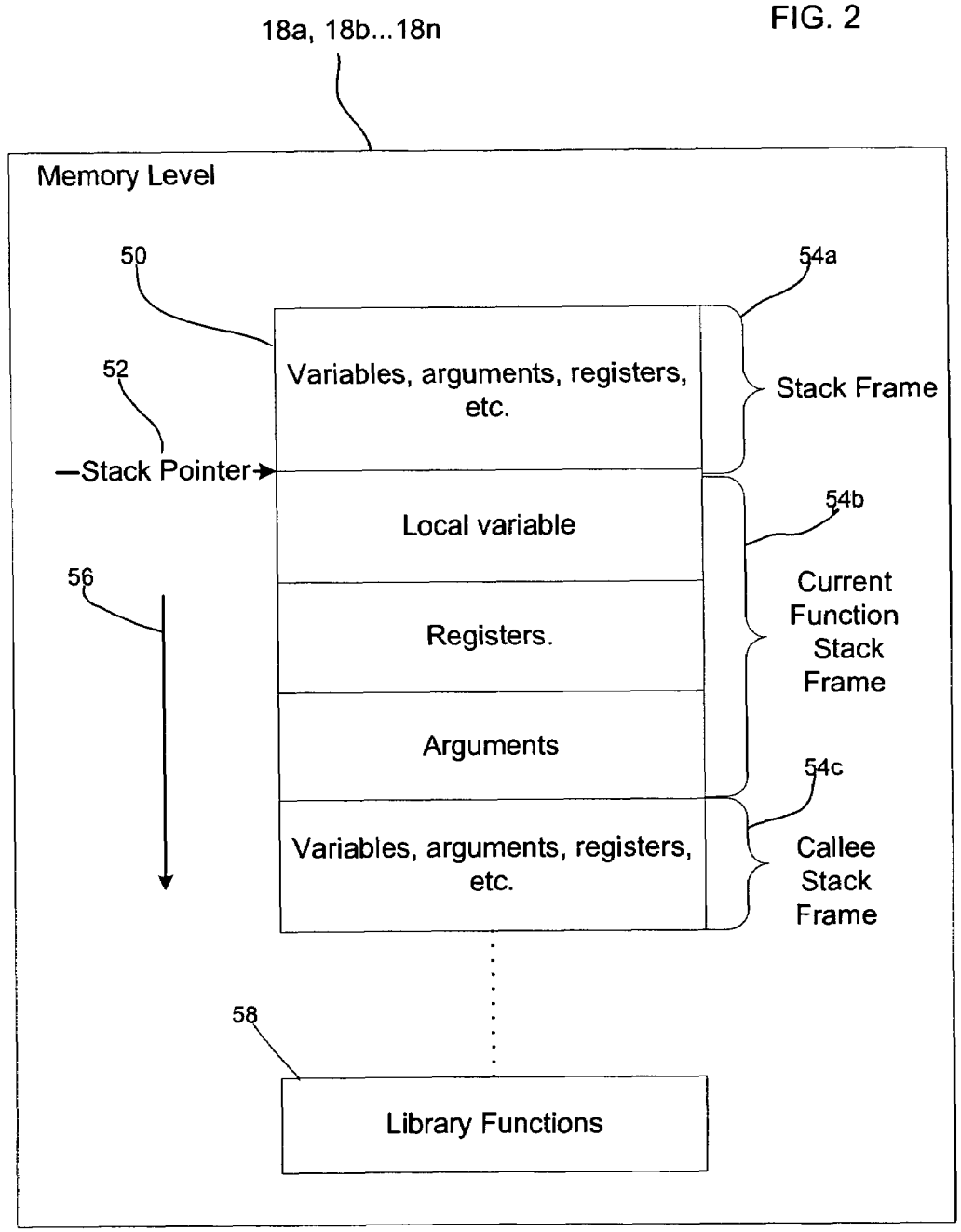
FIG. 2 illustrates an example of a call stack in memory.

In described embodiments, the executable program 12 may store variables in call stacks in the different memory levels 18a, 18b . . . 18n. FIG. 2 illustrates an example of a call stack 50 in one memory level 18a, 18b . . . 18n, where the stack grows as function state information is added from the lowest (fastest) memory level 18a in the memory hierarchy, toward the higher (slower) memory levels 18b . . . 18n. The call stack in each memory level has a stack pointer 52. The size of the call stack in each memory level 18a, 18b . . . 18n may be set by the compiler 6, where there are multiple call stacks implemented in each memory level. Each thread may have one call stack by definition. Each function is associated with a stack frame 54a, 54b . . . 54c. The contents of the stack frame include entries in the call stack including state information. The call stack grows in the direction 56. The call stack 50 further includes library functions 58 of shared functions.

Figure 3:
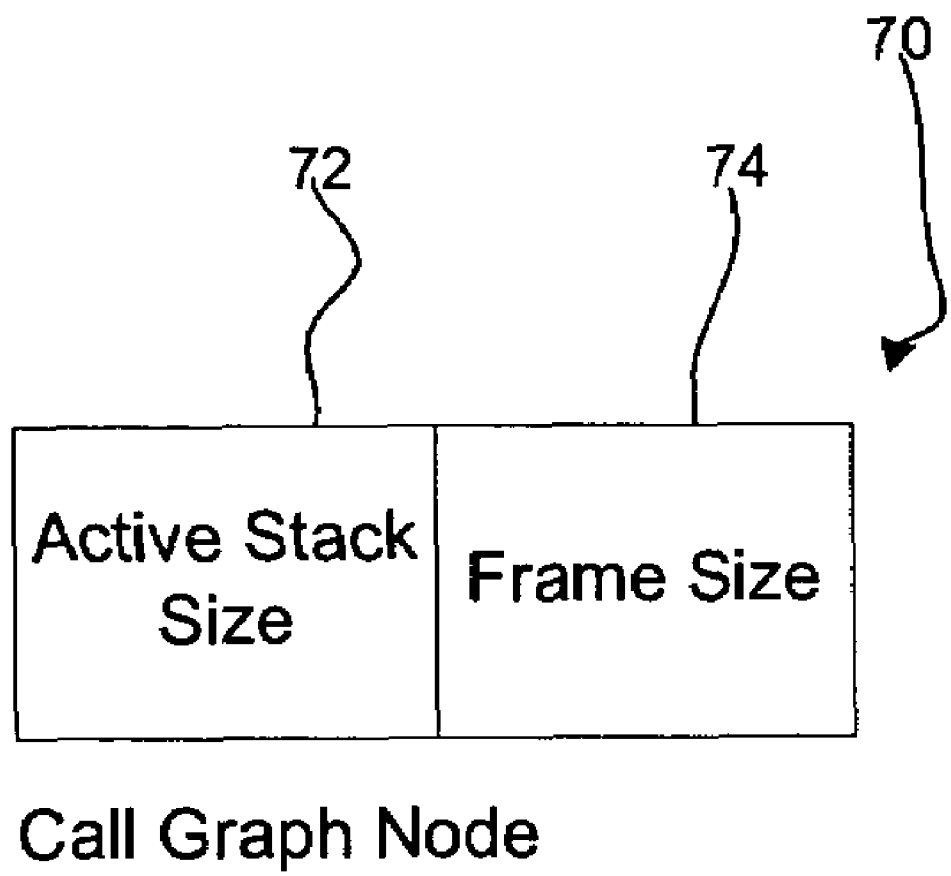
FIG. 3 illustrates an embodiment of information included in a call graph node.

FIG. 3 illustrates information 70 maintained at each node in the call graph 14, including an active stack size 72, which indicates the accumulated size, i.e., number of stack entries for stack frames in the call stack preceding the function represented by the node. The frame size 74 indicates the number of stack frame entries, or number of bytes, occupied by the current function. The active stack size 72 indicates the start location in the call stack of the current function, which starts at the stack entry following the stack frame entry at the offset of the active stack size 72. If a function includes stack frame entries in different memory levels, then the call graph node for that function would include an instance of the information 70 for each memory level 18a, 18b . . . 18n including stack frame entries for the function. The call stack 50 may span multiple memory levels 18a, 18b . . . 18n, which have a known hierarchical relationship. The active stack size 72 may indicate a location at any memory level 18a, 18b . . . 18n. Thus, if an active stack size indicates an entry beyond the space boundary of any of the higher memory levels, e.g., 18a, then the active stack size indicates a location in a lower memory level, e.g., 18b.

Figure 4:
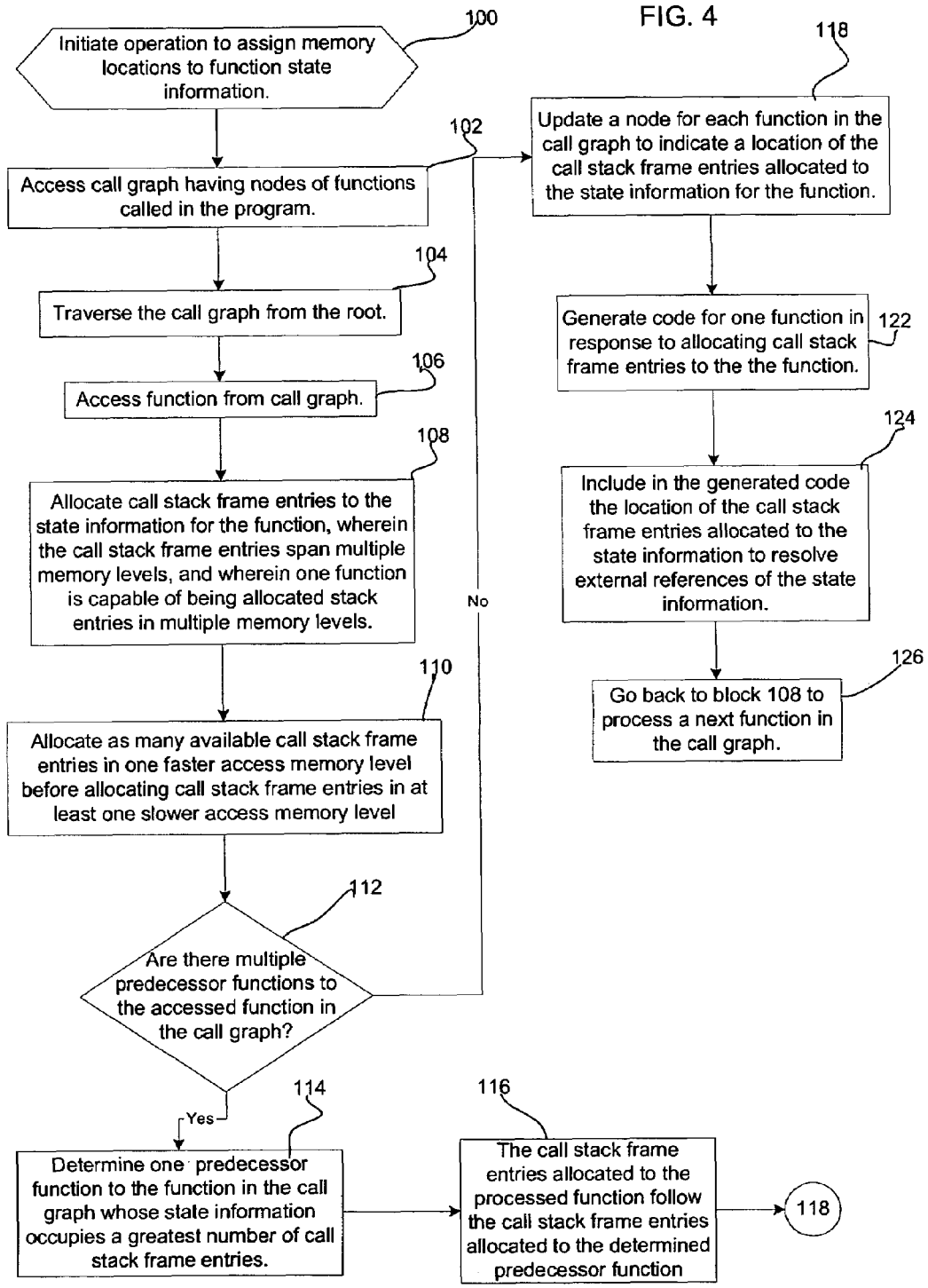
FIGS. 4 and 5 illustrate an embodiment of operations to allocate call stack frame entries to functions.

FIG. 4 illustrates operations performed by the compiler 6, or some other program module, such as a linker or code generator, to allocate memory locations in the memory levels 18a, 18b . . . 18n to state information when generating the executable code 12. The compiler 12 initiates (at block 100) operations to assign memory locations in the memory levels 18a, 18b . . . 18n to function state information. The call graph 14 having nodes of functions called in the program is accessed (at block 102). The compiler 12 traverses (at block 104) the call graph 14 from a root node and accesses (at block 106) a function from the call graph 12. The compiler 6 allocates (at block 108) call stack 50 frame entries to the state information for the function. As discussed, the call stack frame entries may span multiple memory levels 18a, 18b . . . 18n and the state information for one function may be located in multiple memory levels 18 as, 18b . . . 18n. When allocating call stack frame entries, the compiler 6 may allocate (at block 110) as many available call stack frame entries in one faster access memory device before allocating call stack frame entries in at least one slower access memory device, where the active stack size 72 may reference an entry in any of the memory levels 18a, 18b . . . 18n.

A determination is made (at block 112) as to whether there are multiple predecessor functions to the accessed function in the call graph 12. Multiple predecessor functions to one function indicate that the function/callee may be called from two different call paths. If there are multiple predecessor functions, then the compiler 6 determines (at block 114) one predecessor function to the function in the call graph 14 whose state information occupies a greatest number of call stack frame entries or has the largest offset in the memory level, which may be determined as the maximum active stack size 72 plus frame size 74 of the predecessor functions. In certain embodiments, the call stack frame entries allocated (at block 116) to the function being processed follow the call stack frame entries allocated to the determined predecessor function. In this way, the function's frame in the call stack necessarily follows the call stack frame entries used by the caller predecessor function because the call stack frame entry follows the largest call stack frame of the predecessor functions.

After allocating call stack frame entries to the function (from block 116 or the no branch of block 112), the compiler 6 updates (at block 118) a node for the function in the call graph 14 allocated call stack frame entries to indicate an offset indicating a location of the call stack frame entries allocated to the state information for the function. The offset may comprise an active stack size in field 72 indicating the offset to the last call stack frame entry allocated to one predecessor function, i.e., the number of frame entries allocated in the call stack 50. The frame size 74 of the total number of call stack frame entries allocated to the function may also be indicated in the node information 70 for the function in the call graph 14.

After allocating call stack frame entries in one or more memory levels 18a, 18b . . . 18n for a function, the compiler 6 generates (at blocks 122 and 124) code for the function, including the allocated memory locations for the state information referencing external memory. Control then returns (at block 126) to block 108 to process any further function nodes in the call graph 14. In the described embodiments, code is generated after allocating call stack frame entries for a function.

With the operations of FIG. 4, memory is allocated to functions according to their ordering in the call graph 12, so that functions identified earlier in the graph have a higher likelihood of being allocated stack entries in faster memory levels than functions at lower levels of the call graph 12.

Figure 5:
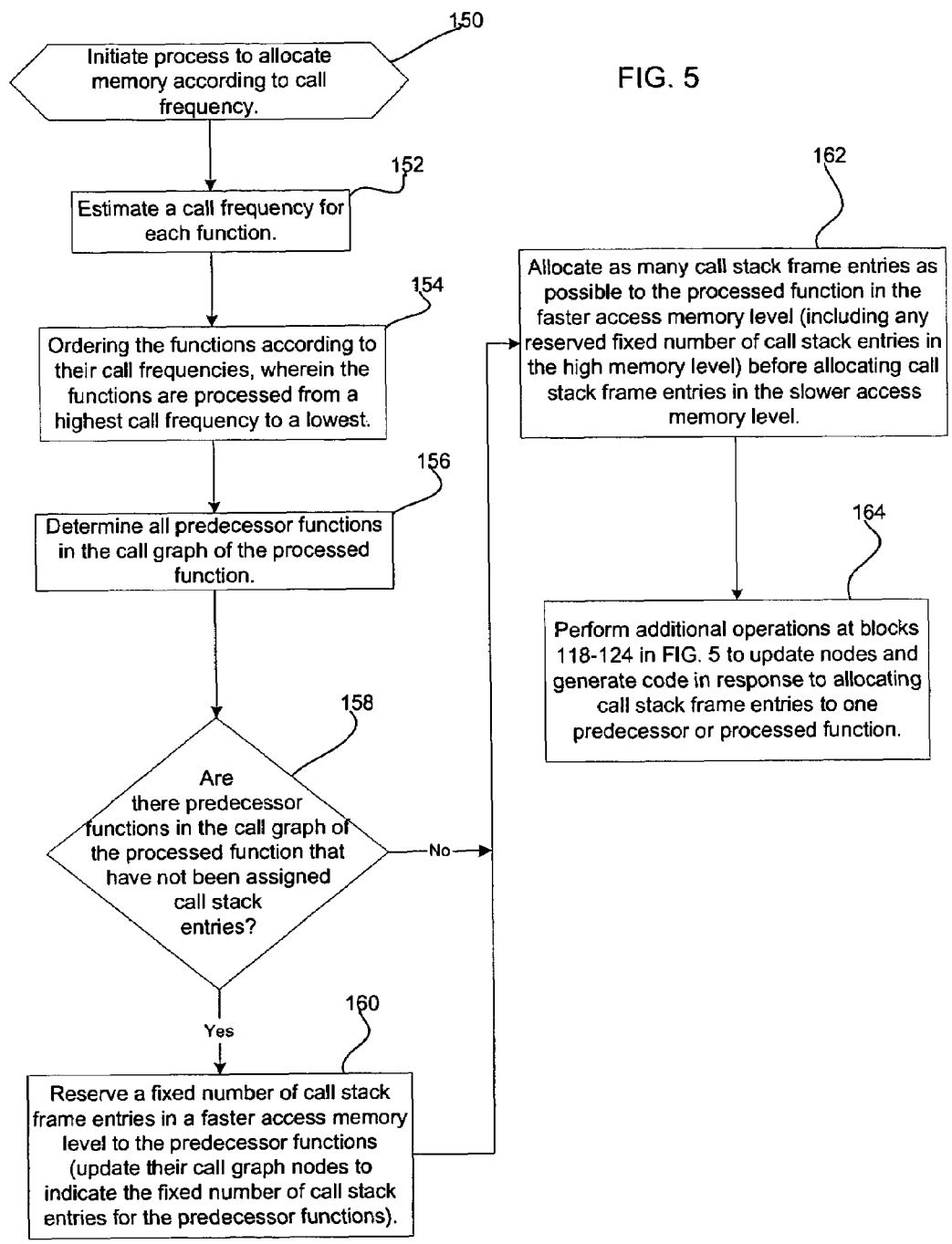

FIG. 5 illustrates operations the compiler 12 performs to allocate frame stack entries based on the frequencies at which the functions are called, so that functions having a relatively higher call frequency have a greater likelihood of being allocated stack entries at faster memory levels, e.g., 18a, than functions having a relatively lower call frequency. Upon initiating (at block 150) a process to allocate memory according to the call frequency of functions, the compiler 6 estimates (at block 152) a call frequency for each function in the call graph 12. In certain embodiments, a call graph profiler program or other profiler tool or simulator may be used to process the call graph 12 to determine the call frequency of each function identified in the call graph 12. The functions are then ordered (at block 154) according to their call frequencies to allow functions having a higher call frequency to be processed and allocated call stack frame entries before functions having a lower call frequency. The compiler 6 determines (at block 156) all predecessor function in the call graph of the processed function.

If (at block 158) there are determined predecessor functions in the call graph 14 of the processed function that have not been assigned call stack entries, then the compiler 6 reserves (at block 160) a fixed number of call stack frame entries in a faster access memory level to the predecessor functions. When reserving the call stack frame entries, the compiler 6 may update the predecessor function call graph nodes to indicate the reserved fixed number of call stack entries for the predecessor functions. For instance, a fixed/minimum number of words or bytes in the fastest access memory level having available call stack frame entries may be allocated to each of these predecessor functions to provide a minimum level of fast access memory to the predecessor functions. Moreover, in an embodiment having another separate region for parameter passing, the fixed number of call stack entries may not be allocated in a faster access memory level for the predecessor function with a lower call frequency because the fixed number of call stack entries may only be allocated when there are spilled arguments which need to be passed by the stack.

If (at block 158) there are no predecessor functions allocated call stack entries or if a fixed number of call stack entries in the faster access memory level, e.g., 18b, have been reserved (at block 160), then the compiler 6 allocates (at block 162) as many call stack frame entries as possible in the faster access memory level to the function accessed from the call frequency ordering (including any reserved fixed number of call stack entries in the high memory level) before allocating call stack frame entries in the slower access memory level. In this way, the functions having a higher call frequency are allocated as much of the faster access memory levels as possible by first assigning a minimum amount of memory locations in the faster access memory level, e.g., 18a, to functions having a lower call frequency not memory. The compiler 12 performs (at block 164) the additional operations at blocks 118-124 in FIG. 5 to update nodes 70 (FIG. 3) and generate the code after allocating the call stack frame entries to one predecessor function and the current function called by one of the predecessor functions. The operations at blocks 156 through 164 are then performed for each function in the call frequency ordering. If a function is processed in the call frequency ordering list that has already been allocated call stack frame entries as a predecessor functions, then the operations at bocks 118-124 are not performed.

Figure 6:
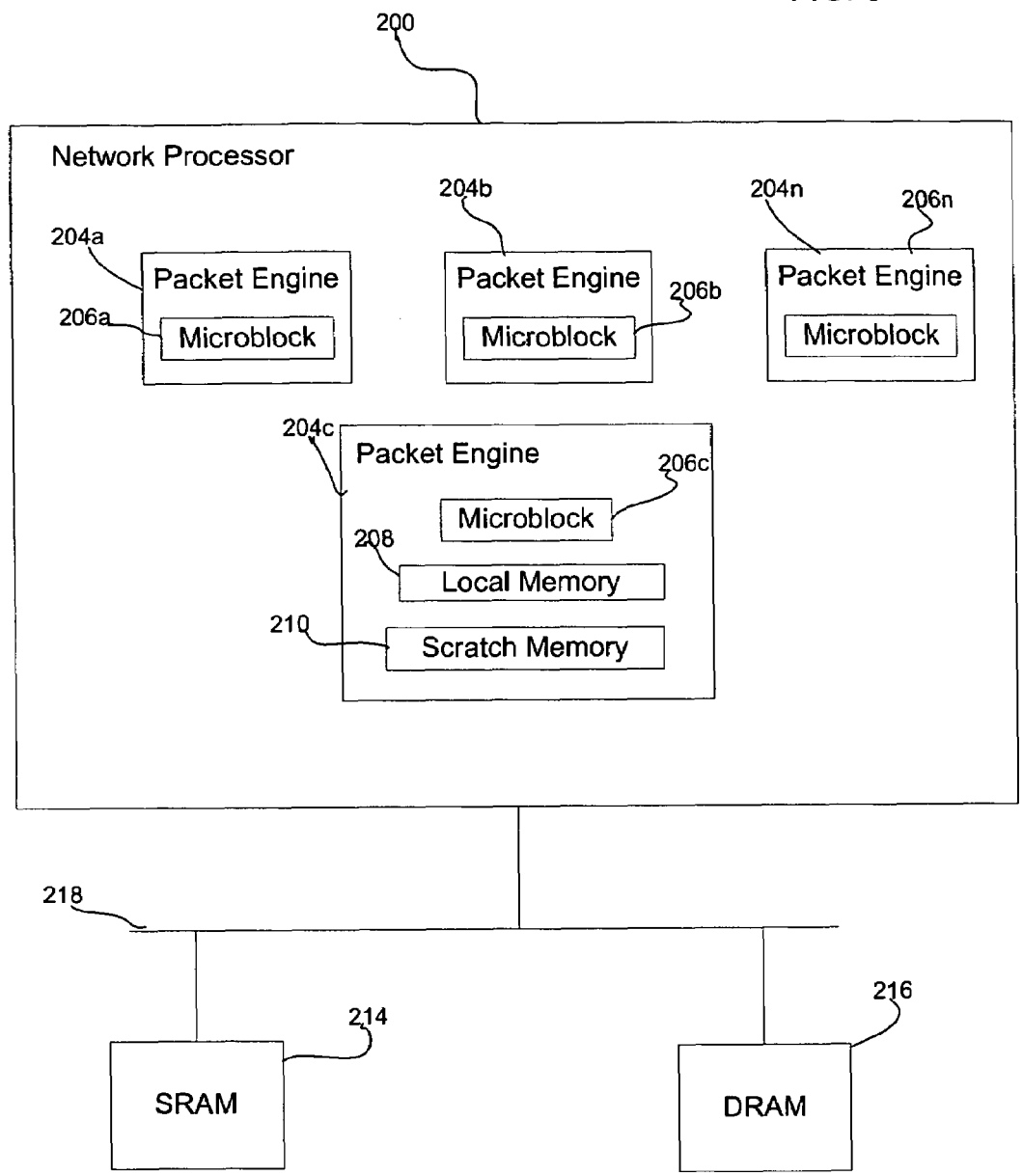
FIG. 6 illustrates an embodiment of a network processor.

FIG. 6 illustrates an embodiment of a network processor, comprising devices that execute programs to handle packets in a data network, such as processors on router line cards, network access equipment and packet forwarding devices. FIG. 7 illustrates one example of a network processor 200 including packet engines 204a, 204b . . . 204n comprising high speed processors specialized for packet processing. The packet engines 204a, 204b . . . 204n may comprise any programmable engine or processor for processing packets, such as a microengine, etc. The packet engines 204a, 204b . . . 204n may execute microcode 206a, 206b . . . 206n, such as microblocks, to process packets, where the microcode comprises fast-path packet processing logic executed by the packet engines 4a, 4b . . . 4n. The packet engines 204a, 204b . . . 204n may instantiate multiple threads to execute different parts of the microcode 206a, 206b . . . 206n, where each thread would have its own call stack in the memory levels FIG. 6 further shows four different memory levels used by the packet engines 204a, 204b . . . 204n, including a local memory 208 and scratch memory 210 associated with each packet engine 4a, 4b . . . 4n, which may be implemented in an onboard cache to the packet engines 204a, 204b . . . 204n. A Static Random Access Memory (SRAM) 214 and Dynamic Random Access Memory (DRAM) 216 are accessible to all the packet engines 204a, 204b . . . 204n over interface 218. The packet engines 204a, 204b . . . 204n prefer to store state information for the microcode 206a, 206b . . . 206n they are executing in stack entries in their local 208 and scratch 210 memories, and then the SRAM 214 and DRAM 216 if needed.

When generating the executable microcode 206a, 206b . . . 206n to be executed by the packet engines 204a, 204b . . . 204n, the compiler 6 allocates memory locations per the operations described above. In this way, the call stack frame entries assigned to a frame for a called function may span the different memory levels. Further, certain information may be stored in a specific memory level, such as packet data stored in the DRAM 216 and queues and control information used for processing the packets stored in the SRAM 14.

With the described embodiments, the compiler or code generator allocates call stack frame entries to functions that may span multiple memory levels, i.e., memory devices, so that a call stack frame for a function may span multiple memory levels. With the described embodiments, each call stack for an executing thread may be limited in size so that multiple call stacks, one for each concurrently executing thread, may be implemented in each memory level to allow the functions from different concurrently executing threads to be allocated stack entries at multiple memory levels.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

The term packet was used in the above description to refer to a packet conforming to a network communication protocol. However, a packet may also be a frame, fragment, ATM cell, and so forth, depending on the network technology being used. Alternatively, a packet may refer to a unit of data transferred from devices other than network devices, such as storage controllers, printer controllers, etc. In such alternative implementations, the key from the header for such alternative packets may include information that is not related to the transmission of a packet over a network.

The illustrated operations of FIGS. 4 and 5 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   traversing a call graph to process functions in a program in the call graph accessing state information stored in call stack frame entries;
   allocating at least one call stack frame entry to the state information for each function, wherein the call stack frame entries span multiple memory levels, and wherein one function is capable of being allocated stack entries in multiple memory levels; and
   updating a node for each function in the call graph to indicate one memory level and an offset into the indicated memory level indicating a location of the call stack frame entries allocated to the function.

2. The method of claim 1, wherein the call stack frame entries allocated to the state information for each function comprise a frame of contiguous call stack frame entries.

3. The method of claim 1, wherein the offset comprises an active stack size indicating a last call stack frame entry in the memory level allocated to one function in the indicated memory level.

4. The method of claim 1, further comprising:
determining one of multiple predecessor functions to the function in the call graph whose state information occupies a greatest number of call stack frame entries, wherein the call stack frame entries allocated to the processed function follow the call stack frame entries allocated to the determined predecessor function.

5. The method of claim 1, wherein updating the node for one function allocated call stack frame entries spanning multiple memory levels comprises:
updating the node for the function in the call graph to indicate each memory level and the offset into each memory level of the location of the call stack frame entries allocated to the function.

6. The method of claim 1, wherein allocating the call stack frame entries comprises:
allocating as many available call stack frame entries in one faster access memory level before allocating call stack frame entries in at least one slower access memory level.

7. The method of claim 1, further comprising:
generating code for one function in response to allocating call stack frame entries to the function; and
including in the generated code the location of the at least one call stack frame entry allocated to the state information to resolve external references of the state information.

8. The method of claim 1,
wherein processing the functions comprises:
estimating a call frequency for each function;
ordering the functions according to their call frequencies, wherein the functions are processed from a highest call frequency to a lowest;
wherein allocating the call stack frame entries for one function processed according to the ordering comprises:
determining all predecessor functions in the call graph of the processed function; and
reserving call stack frame entries to each predecessor function not previously allocated call stack frame entries.

9. The method of claim 8, wherein reserving call stack frame entries to each predecessor function comprises reserving a fixed number of call stack frame entries in a faster access memory level to the predecessor functions, and further comprising:
allocating the reserved fixed number of call stack entries in the faster access memory and a remainder of the call stack frame entries in a slower access memory level for the predecessor functions when allocating call stack entries to the predecessor functions according to the ordering.

10. The method of claim 1, wherein the state information is a member of a set of state information comprising: local variables, register spills, caller/callee saved registers, spilled arguments, and return objects and values.

11. A method, comprising:
processing functions in a program accessing state information stored in call stack frame entries, wherein the functions are executed by multiple packet engines in a network processor; and
allocating call stack frame entries to the state information for each function, wherein the call stack frame entries span multiple memory levels, wherein one function is capable of being allocated stack entries in multiple memory levels, and wherein the memory levels comprise at least one local memory specific to one packet engine and at least one attached memory device shared by the packet engines.

12. A system for translating code capable of accessing multiple memory levels, comprising:
a processor;
a computer readable storage medium including a compiler program executed by the processor to perform:
traverse a call graph to process functions in a program in the call graph accessing state information stored in call stack frame entries in the memory levels;
allocate at least one call stack frame entry to the state information for each function, wherein the call stack frame entries span the multiple memory levels, and wherein one function is capable of being allocated stack entries in multiple memory levels; and
update a node for each function in the call graph to indicate one memory level and an offset into the indicated memory level indicating a location of the call stack frame entries allocated to the function.

13. The system of claim 12, wherein the call stack frame entries allocated to the state information for each function comprise a frame of contiguous call stack frame entries.

14. The system of claim 12, wherein the offset comprises an active stack size indicating a last call stack frame entry in the memory level allocated to one function in the indicated memory level.

15. The system of claim 12, wherein the compiler program is further executed to:
determine one of multiple predecessor functions to the function in the call graph whose state information occupies a greatest number of call stack frame entries, wherein the call stack frame entries allocated to the processed function follow the call stack frame entries allocated to the determined predecessor function.

16. The system of claim 12, wherein updating the node for one function allocated call stack frame entries spanning multiple memory levels comprises:
updating the node for the function in the call graph to indicate each memory level and the offset into each memory level of the location of the call stack frame entries allocated to the function.

17. The system of claim 12, wherein allocating the call stack frame entries comprises:
allocating as many available call stack frame entries in one faster access memory level before allocating call stack frame entries in at least one slower access memory level.

18. The system of claim 12, wherein the compiler program is further executed to:
generate code for one function in response to allocating call stack frame entries to the function; and
include in the generated code the location of the at least one call stack frame entry allocated to the state information to resolve external references of the state information.

19. The system of claim 12,
wherein processing the functions comprises:
estimating a call frequency for each function;
ordering the functions according to their call frequencies, wherein the functions are processed from a highest call frequency to a lowest;
wherein allocating the call stack frame entries for one function processed according to the ordering comprises:
determining all predecessor functions in the call graph of the processed function; and reserving call stack frame entries to each predecessor function not previously allocated call stack frame entries.

20. The system of claim 19, wherein reserving call stack frame entries to each predecessor function comprises reserving a fixed number of call stack frame entries in a faster access memory level to the predecessor functions, and further comprising:

allocating the reserved fixed number of call stack entries in the faster access memory and a remainder of the call stack frame entries in a slower access memory level for the predecessor functions when allocating call stack entries to the predecessor functions according to the ordering.

21. The system of claim 12, wherein the state information is a member of a set of state information comprising: local variables, register spills, caller/callee saved registers, spilled arguments, and return objects and values.

22. A system for translating code capable of accessing multiple memory levels, comprising:

a processor;

a computer readable storage medium including a compiler program executed by the processor to perform:

process functions in a program accessing state information stored in call stack frame entries in the memory levels, wherein the functions are executed by multiple packet engines in a network processor;

allocate call stack frame entries to the state information for each function, wherein the call stack frame entries span the multiple memory levels, wherein one function is capable of being allocated stack entries in multiple memory levels, and wherein the memory levels comprise at least one local memory specific to one packet engine and at least one attached memory device shared by the packet engines.

23. An article of manufacture comprising a computer readable storage medium having a compiler executed by a processor to generate code capable of accessing a plurality of memory levels, wherein the compiler executed to perform operations comprising:

traversing a call graph to process functions in a program in the call graph accessing state information stored in call stack frame entries;

allocating at least one call stack frame entry to the state information for each function, wherein the call stack frame entries span multiple memory levels, and wherein one function is capable of being allocated stack entries in multiple memory levels; and updating a node for each function in the call graph to indicate one memory level and an offset into the indicated memory level indicating a location of the call stack frame entries allocated to the function.

24. The article of manufacture of claim 23, wherein the call stack frame entries allocated to the state information for each function comprise a frame of contiguous call stack frame entries.

25. The article of manufacture of claim 23, wherein the offset comprises an active stack size indicating a last call stack frame entry in the memory level allocated to one function in the indicated memory level.

26. The article of manufacture of claim 23, wherein the operations further comprise:

determining one of multiple predecessor functions to the function in the call graph whose state information occupies a greatest number of call stack frame entries, wherein the call stack frame entries allocated to the processed function follow the call stack frame entries allocated to the determined predecessor function.

27. The article of manufacture of claim 23, wherein updating the node for one function allocated call stack frame entries spanning multiple memory levels comprises:

updating the node for the function in the call graph to indicate each memory level and the offset into each memory level of the location of the call stack frame entries allocated to the function.

28. The article of manufacture of claim 23, wherein allocating the call stack frame entries comprises:

allocating as many available call stack frame entries in one faster access memory level before allocating call stack frame entries in at least one slower access memory level.

29. The article of manufacture of claim 23, wherein the operations further comprise:

generating code for one function in response to allocating call stack frame entries to the function; and including in the generated code the location of the at least one call stack frame entry allocated to the state information to resolve external references of the state information.

30. The article of manufacture of claim 23, wherein processing the functions comprises:

estimating a call frequency for each function;

ordering the functions according to their call frequencies, wherein the functions are processed from a highest call frequency to a lowest;

wherein allocating the call stack frame entries for one function processed according to the ordering comprises:

determining all predecessor function in the call graph of the processed function; and reserving call stack frame entries to each predecessor function not previously allocated call stack frame entries.

31. The article of manufacture of claim 30, wherein reserving call stack frame entries to each predecessor function comprises reserving a fixed number of call stack frame entries in a faster access memory level to the predecessor functions, and further comprising:

allocating the reserved fixed number of call stack entries in the faster access memory and a remainder of the call stack frame entries in a slower access memory level for the predecessor functions when allocating call stack entries to the predecessor functions according to the ordering.

32. The article of manufacture of claim 23, wherein the state information is a member of a set of state information comprising: local variables, register spills, caller/callee saved registers, spilled arguments, and return objects and values.

33. An article of manufacture comprising a computer readable storage medium for generating code capable of accessing a plurality of memory levels, wherein the article of manufacture is enabled to perform operations comprising:

processing functions in a program accessing state information stored in call stack frame entries, wherein the functions are executed by multiple packet engines in a network processor; and allocating call stack frame entries to the state information for each function, wherein the call stack frame entries span multiple memory levels, wherein one function is capable of being allocated stack entries in multiple memory levels, and wherein the memory levels comprise at least one local memory specific to one packet engine and at least one attached memory device shared by the packet engines.

* * * * *